United States Patent [19]

Agarwal et al.

[11] 4,371,640

[45] Feb. 1, 1983

[54] HOT MELT ADHESIVE COMPOSITIONS

[75] Inventors: Pawan K. Agarwal, Westfield; Henry S. Makowski, Scotch Plains, both of N.J.

[73] Assignee: Exxon Research and Engineering Co., Florham Park, N.J.

[21] Appl. No.: 292,191

[22] Filed: Aug. 12, 1981

[51] Int. Cl.³ .............................................. C08L 95/00
[52] U.S. Cl. ................................... 524/66; 524/59; 524/69; 524/71; 524/481; 524/482; 524/484
[58] Field of Search ............... 260/24, 27 R, 27 BB, 260/28.5 AS, 28.5 A, 28.5 D, 28 R; 524/66, 59, 69, 71, 481, 482, 484

[56] References Cited

U.S. PATENT DOCUMENTS 3,642,728  2/1972  Canter ................................. 525/347
3,801,531  4/1974  Berejka et al. ................. 260/27 BB
3,836,511  9/1974  O'Farrell et al. ................... 525/344
3,867,247  2/1975  O'Farrell et al. ............... 260/33.4 R

*Primary Examiner*—Melvyn I. Marquis
*Attorney, Agent, or Firm*—Richard E. Nanfeldt

[57] ABSTRACT

This invention relates to hot melt adhesive compositions which include an amine terminated polyalkylene oxide neutralized sulfonated thermoplastic polymer wherein the neutralized sulfonated thermoplastic polymer has about 5 to about 250 meq. of neutralized sulfonate groups per 100 grams of the neutralized sulfonated thermoplastic polymer, and about 25 to about 200 parts by weight of a hydrocarbon resin of a petroleum or coal tar distillate, having about 5 to 6 carbon atoms, the hydrocarbon resin being composed of aliphatic dienes and monoolefins per 100 parts by weight of the neutralized sulfonated thermoplastic resin.

13 Claims, No Drawings

HOT MELT ADHESIVE COMPOSITIONS

BACKGROUND OF THE INVENTION

1. Field of the Invention

This invention relates to hot melt adhesive compositions which include an amine terminated polyalkyline oxide neutralized sulfonated thermoplastic polymer wherein the neutralized sulfonated thermoplastic polymer has about 5 to about 250 meq. of neutralized sulfonate groups per 100 grams of the neutralized sulfonated thermoplastic polymer, and less than about 200 parts by weight of a hydrocarbon resin of a petroleum or coal tar distillate, having about 5 to 6 carbon atoms, the hydrocarbon resin being composed of aliphatic dienes and monoolefins per 100 parts by weight of the neutralized sulfonated thermoplastic resin.

Broadly speaking, synthetic adhesives used in packaging can be classified into four categories: water based, solvent based, reactive and hot melt adhesives. Of these four, currently the water based are used most extensively. Usually the water based adhesives are based on emulsion polymers and are applied to porous cellulosic substrates. Energy from the outside in some fashion is applied to the system to evaporate the water in order that a strong bond may be formed. Beside this energy requirement for the formation of the bond, there is another complication with the use of water based adhesive. For a uniform coating, a good uniform wetting of the substrate surface is desired, which is not easily achieved.

With the solvent-based adhesives usually a good wetting is achieved; however, their use has been becoming extremely restrictive due to expensive energy requirements for the evaporation of organic solvents, fire hazards associated with the use of these organic solvents and emissions problems with said solvents. The strict government environmental regulations and restrictions concerning worker's exposure to solvent vapors, etc. has placed extra pressure on the packager to use non-solvent based adhesives.

As a result, the use of hot melt adhesives has been growing very rapidly in the packaging industry. The hot melt adhesives are generally applied (as the name implies) by conventional extrusion or coating techniques in the temperature range of 250° to 450° F. on one of the surfaces to be bonded. The other surface is brought in contact with the hot surface for a sufficient period of time for the melt to cool, whereupon solidification, a strong and durable bond is formed.

The key requirements of resins suitable for hot melt adhesive applications are that they should have good physical properties, e.g., tensile strength, etc., at ambient conditions, and they can flow easily at fabrication temperatures. The ethylene vinyl acetate (EVA) copolymers and styrene block copolymers, such as Kraton, have been extensively used as hot melt adhesives; however, their use has been limited largely to pressure sensitive adhesives.

There is a significant demand in the marketplace today for polymer systems which exhibit good green strength or tensile properties at ambient temperatures which, when heated to a predetermined temperature, will give good flow such that they may be applied to a coating or substrate by melt extrusion or other suitable techniques. In the past, it has been common to employ organic solutions as a way of applying a coating of a polymer system which is designed to have good adhesive properties. This practice is now under considerable pressure, due to the fact that the organic solvents must be evaporated from the coating giving rise to pollution problems and excess energy requirements.

2. Prior Art

Several U.S. Patents have described sulfonated polymers such as sulfonated Butyl and sulfonated EPDM in adhesive applications (e.g., U.S. Pat. No. 3,867,247 and U.S. Pat. No. 3,801,531). It is important to distinguish the instant invention over those prior art systems. The former patent is directed at a sulfonated butyl cement which is solvent based and is employed to laminate various substrates. It is important to note that the instant invention differs dramatically from that patent as follows:

(a) The adhesives of the instant invention are not deposited from solvents, but are hot melt and require no solvents.

(b) The instant invention may optionally include either a tackifier resin and/or plasticizer capable of associating with the neutralized sulfonate groups, and thereby reducing the melt viscosity of the resulting blends to make the systems more processable;

(c) The instant invention is directed to sulfonated thermoplastic polymers which are neutralized with amine terminated polyalkylene oxides.

(d) The instant invention is directed at sulfonated thermoplastic polymers whereas most of the prior art deals with sulfonated Butyl rubber (e.g., U.S. Pat. No. 3,867,247).

With regard to the latter point, historically polystyrene systems do not possess any tack properties at all. This problem becomes even more acute when polystyrene is sulfonated to levels of 5 to 250 milliequivalents (meq.) per 100 grams of polymer and neutralized with metal cations for example, zinc, iron, etc. The resulting compositions have been widely used as the basis for ionically crosslinked thermoplastics elastomers. The use of these materials in such applications is, in part, a demonstration that the properties of such materials are just the opposite of those desired for adhesive. In fact, such materials are remarkably devoid of tack or adhesion. The tack, therefore, of converting such physically crosslinked materials into suitable adhesive candidates is a particularly challenging one for two reasons: (a) the polystyrene backbone is particularly unsuited for that purpose being a very dry thermoplastic; (b) the strong associations attributable to metal sulfonate crosslinks further inhibit adhesion to any particular substrate.

Despite these handicaps, there are some very good reasons for solving the problems associated with converting sulfonated polystyrene into a good hot melt adhesive composition. The excellent thermal stability inherent in the polystyrene backbone is a very desirable property for adhesives which will be exposed to high temperatures for long times. Most adhesives based on other elastomeric backbones can suffer degradation under those conditions.

SUMMARY OF THE INVENTION

This invention relates to hot melt adhesive compositions which include an amine terminated polyalkylene oxide neutralized sulfonated thermoplastic polymers which has about 5 to about 250 meq. of neutralized sulfonate groups per 100 grams of the neutralized sulfonated thermoplastic polymer and about 0 to about 200 parts by weight of a hydrocarbon resin of a petroleum or coal tar distillate, having about 5 to about 6 carbon atoms, said hydrocarbon resin having aliphatic dienes and monoolefins therein per 100 parts by weight of the amine terminated polyalkylene oxide neutralized sulfonated thermoplastic polymer and optionally, about 1 to 50 parts of a preferential plasticizer per 100 parts of the amine terminated polyalkylene oxide neutralized sulfonated thermoplastic polymer can be optionally added to the composition.

GENERAL DESCRIPTION

The present invention relates to unique and novel hot melt adhesive compositions which comprise a blend of an amine terminated polyalkylene oxide neutralized sulfonated thermoplastic polymer and a hydrocarbon resin, wherein to the compositions can be optionally added an ionic preferential plasticizer, oil, and/or a filler, thereby modifying the rheological and physical properties of the hot melt adhesive compositions.

SULFONATED POLYMER AND PROCESS FOR FORMING

The neutralized sulfonated thermoplastic polymers of this present instant invention are derived from thermoplastic polymers which have a softening point (glass transition temperature) of between about 25° C. to about 260° C., and more preferably about 25° C. to about 150° C., and most preferably to about 35° C. to about 150° C. These thermoplastic polymers have a weight average molecular weight ($\overline{M}n$) as measured by GPC of about 5,000 to 1,000,000 and more preferably about 10,000 to about 500,000. The term "thermoplastic" is used in its conventional sense to mean a substantially rigid (flexural modulus $\geq$ 10,000 psi) material capable of retaining the ability to flow at elevated temperatures for relatively long times.

The thermoplastic polymers can be prepared by a direct addition polymerization processes, wherein the chief monomeric components are selected from the group consisting of the following:

Alpha olefins, such as styrene, vinyl toluene, t-butylstyrene, alpha-methyl styrene, chlorostyrene, vinyl cyclohexane, 1,6 heptadiene, and the like; Acrylates and methacrylates, such as methyl methacrylate; Vinyl acylates, such as: vinyl acetate. Vinyl halides, such as: vinyl chloride. Nitrile containing monomers, such as acrylonitrile and methacrylonitrile; Cyclic monomers, such as oxycyclobutane, tetrahydrofuran, trimethylene sulfide, lactones, e.g., caprolactone; Aldehydes, such as formaldehyde, acetaldehyde; Vinyl alkyl ethers; and Amide containing monomers, such as acrylamide.

The thermoplastic polymers can also be prepared by a condensation processes, such as polyesters, polyanhydrides, polyamides, polycarbonates.

Preferably thermoplastic polymers are polyvinylaromatics, most preferably polystyrene, poly-t-butylstyrene, polyvinyl toluene, and poly-alpha-methyl styrene.

The sulfonated groups can be readily introduced into the aforementioned monomers polymers by one of four means;

A. Copolymerization with sulfonate containing monomers. Alkali metal salts of styrene sulfonic acid can be copolymerized by using free radical initiators with a plurality of thermoplastic forming monomers such as styrene, acrylamide, methyl methacrylate and t-butylstyrene.

B. Direct sulfonation of homopolymers and copolymer sulfonic acid groups can be introduced into the homo-or copolymers of vinyl aromatic monomers such as styrene by the direct sulfonation reaction with a sulfonating agent such as an acyl sulfate.

The polystyrene thermoplastics suitable for use in the practice of the invention have a glass transition temperature from about 80° C. to about 150° C., more preferably about 90° C. to about 140° C. and most preferably about 90° C. to about 120° C. These polystyrene resins have a weight average molecular weight of about 5,000 to about 500,000, more preferably about 20,000 to about 350,000 and most preferably about 70,000 to about 300,000. These base polystyrene thermoplastic resins can be prepared directly by any of the known polymerization processes.

The preferred polystyrene thermoplastic resin is a homopolymer of styrene having a number average molecular weight of, as measured by EPC, of about 100,000. These polymers are widely available commercially in large volume. A suitable material is Dow Polystyrene 666 which affords a suitable molecular weight.

The sulfonated polystyrene resins are formed by dissolving the polystyrene resin in a non-reactive solvent such as chlorinated aliphatic solvent, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane, or heptane. The preferred solvents are the lower boiling aliphatic hydrocarbons. A sulfonating agent is added to the solution of the elastomeric polymer and non-reactive solvent at a temperature of about $-100°$ C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, incorporated herein by reference. The sulfonating agents are selected from an acyl sulfate or a mixture of sulfuric acid and an acid anhydride. The most preferred sulfonation agent for this invention is an acyl sulfate selected from the group consisting of benzoyl, acetyl, propinyl and butyral sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polystyrene backbone. The reaction is quenched with an aliphatic alcohol such as methanol, ethanol, or isopropanol, with an aromatic hydroxyl compound, such as phenol, and a cycloaliphatic alcohol such as cyclohexanol or with water. The sulfonated polystyrene resin has about 5 to about 250 meq. sulfonate groups per 100 grams of sulfonated polystyrene, more preferably about 7 to about 200. The meq. of sulfonate groups per 100 grams of polymer is determined by both titration of the polymeric sulfonic acid and Dietert Sulfur analysis. In the titration of the sulfonated polymer, the polymer is dissolved in solvent consisting of 95 parts of toluene and 5 parts of methanol at a concentration level of 50 grams per liter of solvent. The sulfonated polystyrene resin is titrated with ethanolic sodium hydroxide to an Alizarin-Thymolphthalein end-point.

The sulfonated polystyrene resin is gel free and hydrolytically stable. Gel is measured by stirring a given weight of polymer in a solvent comprised of 95 toluene-5 methanol at a concentration of 5 wt. %, for 24 hours, allowing the mixture to settle withdrawing a weighed sample of the supernatant solution and evaporating to dryness. Hydrolytically stable means that the acid function, in this case the unneutralized sulfonate groups, will not be eliminated under neutral or slightly basic conditions to a neutral moiety which is incapable of being converted to highly ionic functionality.

C. Direct Sulfonation of Modified Polymers

Where desirable, homopolymers cannot be directly reacted to produce sulfonate-containing materials. It is possible to introduce by copolymerization, functional groups capable of reacting with sulfonating agents. The two most desirable functional groups for this purpose are double bonds and aromatic groups.

1. Copolymers of Aromatic Monomers

Copolymerization of vinyl monomers with styrene or other vinyl aromatics reactive to sulfonating agents produces copolymers capable of being sulfonated. Illustrative examples are chlorostyrene-styrene, styrene-acrylonitrile, styrene-vinyl acetate, etc. In non-vinylic polymer systems, an aromatic group can be introduced into the polymer through the use of an aromatic containing monomer, e.g., phenyl glycidyl either copolymerized with alkylene oxides. The reagents suitable for the introduction of sulfonic acid groups directly are the same as those useful in the direct sulfonation of homopolymers such as acyl sulfate.

2. Polymers Containing Unsaturation

Although unsaturation may be introduced into homopolymers in a number of ways, copolymerization with a conjugated diolefin generally can be relied on to produce thermoplastic materials containing small amounts of unsaturation. Suitable comonomers for the introduction of unsaturation in vinyl polymers are conjugated diolefins, such as butadiene, isoprene, dimethylbutadiene, piperylene and non-conjugated diolefins, such as allyl styrene. Copolymers can be made by using any of the applicable initiating systems, i.e., free radical, cationic, anionic, or coordinated anionic. In polyethers, unsaturation can be introduced by copolymerization with unsaturated epoxides, such as allyl glycidyl ether.

The reagents which are suitable for the direct introduction of sulfonic acid groups into unsaturated thermoplastic are complexes of a sulfur trioxide donor with a Lewis base contaning oxygen, sulfur, or phosphorous. Typical sulfur trioxide donors are $SO_3$, chlorosulfonic acid, fluorosulfonic acid, sulfuric acid and oleum. Typical Lewis bases are dioxane, tetrahydrofuran, tetrahydrothiophene, triallylphosphates such as triethyl phosphate and carboxylic acids. Especially suitable of the trialkyl phosphate complexes are those which have a 1/1 ratio of $SO_3$/trialkyl phosphate. The complexes with carboxylic acids, i.e., the acyl sulfates, are most preferred. These sulfonating agents and the process of sulfonating the polymer are described in U.S. Pat. No. 3,642,728 which is herein incorporated by reference.

D. Oxidation of Sulfur Containing Functional Groups

Polymers which contain sulfonic acid groups can be readily air oxidized to sulfonic acids. Polymers contaning mercaptan groups can be easily converted to the sulfonic acid groups through oxidation of the mercaptan groups with a variety of oxidizing agents, such as hydrogen peroxide, potassium permanganate, and sodium dichromate.

The unneutralized sulfonated containing polymers of the instant invention are neutralized with polyalkylene oxides possessing amine and groups. These are also described as N-polyalkylene oxide substituted amines. The polyalkylene oxide chains are composed of homo- and copolymers of terminal epoxide monomers:

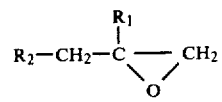

wherein $R_1$ is hydrogen or an alkyl group having about 0 to about 18 carbon atoms group, $R_2$ is a cycloalkyl, aryl group, halogen, an alkoxy group, or an aryloxy group. Examples are ethylene oxide, propylene oxide, butylene oxide, isobutylene oxide, vinyl cyclohexane epoxide, epichlorohydrin, styrene oxide, methyl glycidyl ether, and phenyl glycidyl ether.

The N-polyalkylene oxide substituted amines can be derived from monomamines or poly-amines. The monoamines can be primary, $R_1$—$NH_2$ or secondary, $R_2R_3$—NH, amines wherein the $R_1$, $R_2$ and $R_3$ groups can be alkyl, cycloalkyl, aryl alkaryl and aralkyl. Examples of these substituents are methyl, ethyl, propyl, butyl, decyl, lauryl, octadecyl, cyclohexyl, phenyl, tolyl, benzyl, and the like. The polyamines have the general formula:

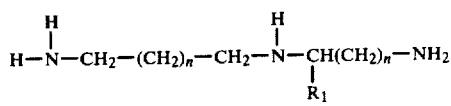

where n=0 to about 5, and $R_1$ is hydrogen, an alkyl or aryl group. Examples of such polyamines are ethylene diamine, 1,2-propylene diamine, 1,3-propylene diamine, 1,6-hexanediamine, diethylene triamine, triethylene, tetramine, and the like. The lower alkylene groups are preferred and the ethylene group is most preferred. Of the ethylene derivatives, ethylene diamine itself is most preferred.

The amine terminated polyalkylene oxide chains can be homo- or copolymers of alkylene oxides. The copolymers may be random or block, and the nature of the copolymer and its composition determines to a large extent the properties of the neutralized polymer and the applications where such compositions might be useful.

The $\overline{Mn}$ molecular weights as measured by GPC of the amine terminated N-polyalkylene oxides can be from about 600 to about 70,000, preferably about 1000 to about 45,000, most preferably about 1200 to about 30,000.

Useful polyalkylene oxide substituted amines are the ethoxylated long chain, fatty acid derived amines such as lauryl amine and stearyl amine

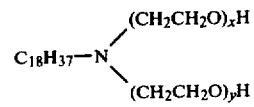

where x plus y can be from 5 to 200. Especially useful are ethoxylated stearyl and lauryl amines where $x+Y=50$.

Useful N-polyalkylene oxide substituted polyamines are the Tetronic (BASF Wyandotte) polyols derived from ethylene diamine, ethylene oxide, and propylene oxide.

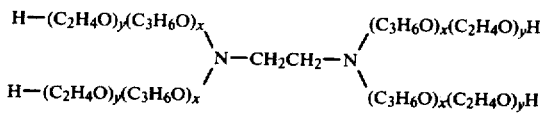

These materials are composed of blocks of propylene oxide and ethylene oxide. They vary in ethylene oxide content (10 to 80 weight %) and in overall molecular weight (1650 to 27,000).

The graft copolymers of this invention possess melt vicosities considerably lower than might be expected simply by an increase in the molecular weight of the base sulfonated thermoplastic polymer. The relatively low molecular weight amines, most especially secondary and the tertiary amines, reduce the melt viscosity of sulfonic acid-containing polymers. The high molecular weight branches change the free volume of the graft copolymer system, and this results in a substantial reduction in both melt viscosity and in solution viscosity. These low viscosities then permit the use of higher solution concentrations or the easy processing of the graft copolymers.

The products resulting from the neutralization of sulfonic acid-containing thermoplastics with amine terminated polyalkylene oxides are determined not only by the composition of the thermoplastic backbone, but also by (1) the sulfonate content of the polymer, (2) the molecular weight of the amine terminated polyalkylene oxide, and (3) the composition of the final neutralized product, i.e., the relative amounts of thermoplastic polymer and amine terminated polyalkylene oxide. It should be clear that the final composition is a function of both sulfonic acid content and molecular weight of the amine terminated polyalkylene oxide.

The solubility characteristics of the graft copolymers are a function of (1) the solubility characteristics of the main chain and the amine terminated polyalkylene oxide and (2) the relative amounts of these two copolymer segments in the graft copolymer. One aspect of this invention is graft copolymers wherein the grafts are composed of some or all ethylene oxide units. The solubility of such systems in polar organic solvents, such as alcohols, and even in water is good.

The sulfonic acid-containing thermoplastics useful for this invention contain from about 5 meq. to about 300 meq. Sulfonate groups per 100 g of polymer, preferably from about 10 meq. to about 250 meq., and most preferably from about 15 meq. to about 200 meq.

To the neutralized sulfonated thermoplastic polymer can be added, in either solution or to the crumb of the sulfonated polymer, a preferential plasticizer selected from the group consisting of carboxylic acids having about 5 to about 30 carbon atoms, more preferably about 8 to about 22 carbon atoms, and basic salts of these carboxylic acids wherein the counterion of the basic salt is selected from the group consisting of aluminum, ammonium, lead and metals of Groups IA, IIA, IB and IIB of the Periodic Table of Elements and mixtures thereof. The carboxylic acids are selected from the group consisting of lauric, myristic, palmitic and stearic acids and mixtures thereof; e.g., zinc stearate, magnesium stearate or zinc laurate.

The preferential plasticizer is incorporated into the neutralized sulfonated elastomeric polymer at about 10 to about 50 parts by weight based on 100 parts by weight of the sulfonated polymer, more preferably at about 7 to about 45, and most preferably at about 9 to about 40.

COMMERCIAL TACKIFIER RESINS

To the amine terminated polyalkylene oxide neutralized sulfonated thermoplastic polymer is added a commercial tackifying resin having a softening point of about 0° C. to about 160° C., more preferably about 50° C. to about 140° C. and most preferably about 70° C. to 120° C. A variety of commercial tackifier resins are available. Some of these resins contain polyterpene resins as the main ingredient, while others are derived from the polymerization of petroleum or coal distillates which consist of aliphatic dienes, mono and di-olefins and cyclic olefins having about 5 to about 6 carbon atoms. The latter type of tackifiers have primarily piperlyne and/or isoprene structure. A general but excellent description of tackifying resins derived from petroleum derivatives can be found in, for example, *Encyclopedia of Polymer Science and Technology*, Vol. 9, pages 853 to 860, chapter by John Findlay, published by John Wiley & Sons, NY (1968).

Typical but non-limiting tradenames of these commercial tackifiers are Wingtak of Goodyear, Escorez of Exxon, Piccolyte of Hercules and Zonrez of Arizona Chemicals. Recently, these and various other companies have also started marketing relatively higher softening point resins. These are generally modified aliphatic hydrocarbon resins and/or hydrogenated polycyclics. The physical appearance of these commercial tackifying resins varies, depending upon their softening point, they can be either viscous liquids or light-colored solids at room temperature. Most often, their initial color (Gardner) is about 3.0 to about 7.0 and the density from about 0.7 to 1.0 gm/cm³ at room temperature. The acid number of these resins is usually less than 1. In general, the molecular weight of these commercial tackifying resins is not homogenous, the number average molecular weight $\overline{M}n$, as measured by GPC, can be from about 300 to about 5000, and more preferably about 500 to about 2000, and most preferably about 700 to 1600.

As well-known to those familiar with the use of tackifying resins, because of their wide range compatability, any of them can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the hot melt adhesive composition at about 25 to about 700 parts by weight per 100 parts by weight of the amine terminated polyalkyline oxide neutralized sulfonated thermoplastic polymer, more preferably about 50 to about 500, and most preferably about 75 to about 300.

METHOD OF FORMING BLEND ADHESIVE COMPOSITION

The blend compositions of the amine terminated polyalkyline oxide neutralized sulfonated thermoplastic polymer with or without preferential plasticizer and the hydrocarbon tackifier resin can be formed by techniques well-known in the art. For example, the blend composition of the hot melt adhesive can be compounded on a hot two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor saving can be obtained through the use of a Farrel Continuous Mixer, a twin screw extruder, or tandem extrusion techniques which are continuous mixing types of equipment. The Banbury mixing device is the preferred batch type mixer, and the twin screw extruder is the preferred continuous mixer.

EXTENDED BLEND ADHESIVE COMPOSITION

To the blend compositions of the hot melt adhesive compositions can be added filler which are selected from the group consisting of talcs, ground calcium carbonate, water precipitated calcium carbonate, delaminated calcined and hydrated clays, silicas, and carbon blacks, and mixtures thereof. These fillers are incorporated into the blend composition at about 5 to about 800 parts by weight per 100 parts by weight of the amine terminated polyalkylene oxide neutralized sulfonated thermoplastic polymer, more preferably at about 50 to about 500; and most preferably at about 75 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85, and most preferably about 10 to about 75. Typical fillers employed in this invention are illustrated in Table I.

TABLE I

| Filler | Code # | Oil Absorption Grams of oil/100 grams of filler | Specific Gravity | Avg. Particle Size Micron | pH |
|---|---|---|---|---|---|
| Calcium Carbonate Ground | Atomite | 15 | 2.71 | | 9.3 |
| Calcium Carbonate Precipitated | Purecal U | 35 | 2.65 | .03–.04 | 9.3 |
| Delaminated Clay | Polyfill DL | 30 | 2.61 | 4.5 | 6.5–7.5 |
| Hydrated Clay | Suprex | 50–55 | 2.6 | 2 | 4.0 |
| Calcined | Icecap K | 60–70 | 2.63 | 1 | 5.0–6.0 |
| Magnesium Silicate | Mistron Vapor | | 2.75 | 2 | 9.0–7.5 |

OIL EXTENDED ADHESIVE COMPOSITIONS

It is observed that the blend composition of the instant invention can also include oils to further improve low temperature properties and tack characteristics of the resulting adhesives levels of oil of less than about 100 parts by weight per 100 parts by weight of the amine terminated polyalkyline oxide neutralized sulfonated thermoplastic polymer can be incorporated, more preferably about 1 to about 90 parts. Oils are particularly useful when high levels of petroleum resin tackifiers are used, since such materials can harden the resulting composition. Oils can further soften and reduce the cost. Typical oils that can be used may be low viscosity aromatic, naphthenic or paraffin petroleum oils. Typical oils are illustrated in Table II.

TABLE II

| Type Oil | Oil Code # | Viscosity ssu | Mn | % Polars | % Aromatic | % Saturates |
|---|---|---|---|---|---|---|
| Paraffinic | Sunpar 115 | 155 | 400 | 0.3 | 12.7 | 87.0 |

TABLE II-continued

| Type Oil | Oil Code # | Viscosity ssu | Mn | % Polars | % Aromatic | % Saturates |
|---|---|---|---|---|---|---|
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

DETAILED DESCRIPTION

The advantages of both the physical properties and adhesive characteristics of the blend compositions of the present inventions can be more readily appreciated by references to the following examples and tables. Unless otherwise specified, all the measurements of the compositions are in parts per hundred by weight.

Preparation of Polymer and Adhesive Compositions and Their Bulk Physical Characteristics

EXAMPLE 1

Polystyrene (Styron 666) was sulfonated with acetyl sulfate, in 1,2-dichloroethane at 50° C. according to the procedure of U.S. Pat. No. 3,836,511 to obtain polystyrene sulfonic acid containing 41.8 meq. of sulfonic acid/100 g of polymer and possessing a melt index (190° C., 250 psi) of 6.8 g/10 minutes and 0.03 g/minutes (190° C., 43 psi).

Four solutions of 50 grams of the above polystyrene sulfonic acid were prepared in methylene chloride at a concentration of 100 g/liter solvent. To these four solutions were added neat four different ethoxylated amines manufactured by the Armak Company: Ethomeen C-20 an ethoxylated cocoamine with 10 moles of ethylene oxide; Ethomeen 18/12, an ethoxylated stearyl amine with 2 moles of ethylene oxide; Ethomeen 18/25, an ethoxylated stearyl amine with 15 moles of ethylene oxide; and Ethomeen 18/60, an ethoxylated stearyl amine with 50 moles of ethylene oxide. To each solution was added 0.5 g of Antioxidant 2246, and stirring was continued for 60 minutes.

The solutions were evaporated in shallow pans in a fume hood, and the residual polymer sheets were dried further in a vacuum oven at 80°–100° C. The results of these runs are given in Table III. In each case, transparent systems were obtained demonstrating that interaction between the ethoxylated amines and sulfonic acid had occurred. Three of the materials were dry and brittle, but the fourth, derived from Ethomeen 18/60 was a relatively tough material.

The melt index data show that even though the overall molecular weight of the graft copolymer increased by as much as a factor of 2; the melt flow increased enormously from the 0.03 g/10 minutes (250 psi) observed for the starting polystyrene sulfonic acid.

TABLE III

| Example | 1-A | 1-B | 1-C | 1-D | 1-E |
|---|---|---|---|---|---|
| Free acid, sulfo-polystyrene, g | 50 | 50 | 50 | 50 | — |
| Total meq. SO$_3$H | 20.9 | 20.9 | 20.9 | 20.9 | — |
| Meq. SO$_3$H/100 g polymer | 41.8 | 41.8 | 41.8 | 41.8 | 41.8 |
| Ethomeen | C-20 | 18/12 | 18/25 | 18/60 | — |
| Base amine | Coco | Stearyl | Stearyl | Stearyl | — |
| Moles ethylene oxide/mole | 10 | 2 | 15 | 50 | — |
| Neutralization Equivalent g/mole | 645 | 362 | 905 | 2470 | — |
| Weight, g | 13.5 | 7.55 | 18.9 | 51.6 | — |
| Mmoles | 20.9 | 20.9 | 20.9 | 20.9 | — |
| g/100g polymer | 27.0 | 15.1 | 37.8 | 103.2 | — |
| MMoles/100g polymer | 41.8 | 41.8 | 41.8 | 41.8 | — |
| Weight % of total | 21 | 13 | 27 | 51 | — |
| Weight % Sulfur | 1.10 | 1.24 | 1.03 | 0.71 | — |
| Moles/100g polymer | 34.4 | 38.8 | 32.2 | 22.2 | — |
| Weight % Nitrogen | 0.35 | 0.52 | 0.33 | 0.31 | — |
| Moles/100g polymer | 25.0 | 37.1 | 23.5 | 22.1 | — |
| Nitrogen/Sulfur | 0.73 | 0.96 | 0.73 | 1.00 | — |
| Appearance* | Transparent, Dry, Brittle | Transparent, Dry, Brittle | Transparent, Dry, Brittle | Transparent, Dry, Brittle | Transparent, Dry, Brittle |
| Melt Index, g/10 minutes** | | | | | |
| (190° C., 43 psi) | 6.44 | 0.68 | 16.3 | Too Fast | 0.03 |
| (190° C., 250 psi) | — | 19.3 | — | — | 6.8 |

*Physical appearance of the final dried bulk neutralized polymer
**Properties of the bulk polymer at room temperature as determined following standard ASTM test.

EXAMPLE 2

The four runs in Example 1 were repeated exactly except that instead of using the polystyrene sulfonic acid described in Example 1, unsulfonated polystyrene (styron 666) was used. In all cases, opaque and brittle mixtures were obtained, and in some cases exudation could be observed. These results show that polystyrene-Ethomeen blends are incompatible. Further, these results taken together with the results of Example 1 demonstrate that the properties of the graft copolymers in Example 1 are not simply due to compatible blends of both components, but that an interaction between the amine and the sulfonic acid occurs. The resultant graft copolymer then has properties substantially different from the simple mixture.

EXAMPLE 3

Three separate polystyrene sulfonic acids were prepared as described in Example 1. They contain 20.5, 27.8, and 62.8 meq. sulfonic acid/100 g polymer. These polymers were dissolved in methylene chloride at a concentration of 100 g/liter solvent and then neutralized with an equimolar portion of Ethomeen 18/60, an ethoxylated stearyl amine with 50 moles of ethylene oxide as described in Example 1. The results of these neutralizations are given in Table IV.

These three runs are compared with Example 1-D which also was neutralized with Ethomeen 18/60. In every case, transparent products were obtained. They varied from dry and brittle to tough and flexible. Again, very large increases in melt index were obtained over those of the base sulfonated polystyrenes. The products in Table V varied in composition from 31 weight % Ethomeen 18/60 to 61 weight % Ethomeen 18/60. This was a direct result of variations in the sulfonic acid contents of the starting sulfonated polystyrenes.

TABLE IV

| Example | 4-A | 4-B | 4-C | 4-D | T-E | T-D | 4-E | 4-F |
|---|---|---|---|---|---|---|---|---|
| Free Acid, Sulfo-polystyrene, g | — | 50.0 | — | 50.0 | — | 50.0 | — | 50.0 |
| Total meq. SO$_3$H | — | 10.25 | — | 13.9 | — | 20.9 | — | 31.4 |
| Meq. SO$_3$H/100g polymer | 20.5 | 20.5 | 27.8 | 27.8 | 41.8 | 41.8 | 62.8 | 62.8 |
| Ethomeen | — | 18/60 | — | 18/60 | — | 18/60 | — | 18/60 |
| Base amine | — | Stearyl | — | Stearyl | — | Stearyl | — | Stearyl |
| Moles ethylene oxide/mole | — | 50 | — | 50 | — | 50 | — | 50 |
| Neutralization equivalent g/mole | — | 2470 | — | 2470 | — | 2470 | — | 2470 |
| Weight, g | — | 25.3 | — | 34.3 | — | 51.6 | — | 77.6 |
| Mmoles | — | 10.25 | — | 13.9 | — | 20.9 | — | 31.4 |
| g/100g polymer | — | 50.6 | — | 68.7 | — | 103.2 | — | 155.1 |
| Mmoles/100g polymer | — | 20.5 | — | 27.8 | — | 41.8 | — | 62.8 |
| Weight % of total | — | 34 | — | 41 | — | 51 | — | 61 |
| Weight % Sulfur | — | 0.37 | — | 0.49 | — | 0.71 | — | 0.82 |
| Moles/100g polymer | — | 11.6 | — | 15.3 | — | 22.2 | — | 25.6 |
| Weight % Nitrogen | — | 0.16 | — | 0.20 | — | 0.31 | — | 0.36 |
| Moles/100g polymer | — | 11.4 | — | 14.3 | — | 22.1 | — | 24.3 |
| Nitrogen/Sulfur | — | 0.99 | — | 0.93 | — | 1.00 | — | 0.95 |
| Appearance* | Trans. Dry, Brittle | Trans. Tough Brittle | Trans. Dry Brittle | Trans. Tough Flexible | Trans. Dry Brittle | Trans. Dry Tough | Trans. Dry Brittle | Trans. Dry Brittle |

TABLE IV-continued

| Example | 4-A | 4-B | 4-C | 4-D | T-E | T-D | 4-E | 4-F |
|---|---|---|---|---|---|---|---|---|
| Melt Index, g/10 minutes** | — | — | — | — | — | — | — | — |
| (190° C., 250 psi) | 13.0 | — | 7.7 | Too Fast | 6.8 | Too Fast | — | Too Fast |
| (190° C., 43 psi) | 0.34 | 39.9 | 0.16 | Too Fast | 0.03 | Too Fast | — | Too Fast |

*Physical appearance of the final dried bulk neutralized polymer.
**Properties of the bulk payment at room temperature as determined following standard ASTM tests.

EXAMPLE 4

A polystyrene sulfonic acid and some of the graft copolymers prepared and described in Examples 1 and 3 were tested for solubility in a variety of solvents. The samples were mixed with various solvents at a concentration of 2 g/40 ml. solvent for up to 24 hours. The results of these solubility tests are given in Table V. It can be seen from the changes in solubility in both acetone and methanol that the graft copolymers are simply not mixtures of components but true graft copolymers.

TABLE 2

| | Example | | | | |
|---|---|---|---|---|---|
| Solvent | 4-B | 4-D | 1-D | 4-F | 4-C |
| 1,2-Dichloroethane | S | S | S | S | S |
| Tetrahydrofuran | S | S | S | S | S |
| Dimethylformamide | S | S | S | S | S |
| Toluene | S | S | S | S | S |
| Isopropanol | I | I | I | I | I |
| Methanol | I | I | I | I | I |
| Acetone | S | S | S | S | I |
| Water | I | I | I | I | I |

S - Soluble
I - Insoluble

EXAMPLE 5

Styron 666 was sulfonated with acetyl sulfate in 1,2-dichloroethane at 50° C. to obtain a polystyrene sulfonic acid containing 51.3 meq. of sulfonic acid/100 g of polymer and possessing a melt index (190° C., 250 psi) of 5.4 g/10 minutes.

Five separate solutions of the sulfonic acid were prepared in methylene chloride, and the sulfonic acid was neutralized with equimolar portions of five separate Tetronic polyols which all contained 40 weight % ethylene oxide, but which varied in molecular weight.

Tetronic polyols have the following general formula:

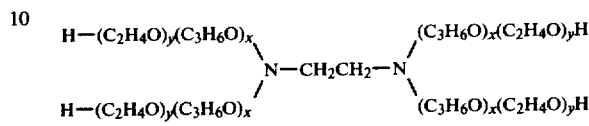

and vary with regard to molecular weight and relative contents of ethylene oxide and propylene oxide. The amount of polystyrene sulfonic acid used was calculated to be that which would provide a total of 100 g of neutralized product. After adding 0.5 g of Antioxidant and stirring for 30 minutes, the neutralized products were isolated as described in Example 1. These runs are summarized in Table VI.

The products contained from 46% to 84% Tetronic polyol. As a result, products were obtained which varied from soft-but-not-sticky solids to thick and very sticky materials which flowed at room temperature. All products were clear and transparent. Sample 5-A was readily molded into a clear and flexible tensile testing pad and possessed a tensile strength of 750 psi and an elongation of 440%.

These results clearly demonstrate the interaction of the basic Tetronic polyol with polystyrene sulfonic acid to produce graft copolymers with a wide variety of properties. This example further illustrates that different type products can be obtained with the same starting sulfonic acid by changing the molecular weight of the amine terminated polyalkylene oxide.

TABLE VI

| Example | 5-A | 5-B | 5-C | 5-D | 5-E |
|---|---|---|---|---|---|
| Free Acid, Sulfopolystyrene | | | | | |
| SO H Content, meq./100g Polymer | 51.3 | 51.3 | 51.3 | 51.3 | 51.3 |
| Weight, g | 54.2 | 36.4 | 26.2 | 19.0 | 15.7 |
| Milliequivalents | 27.8 | 18.7 | 13.4 | 9.8 | 8.0 |
| Tetronic | 304 | 504 | 704 | 1104 | 1304 |
| Molecular Weight | 1650 | 3400 | 5500 | 8300 | 10,500 |
| Weight % Ethylene Oxide | 40 | 40 | 40 | 40 | 40 |
| Weight, g | 45.8 | 63.6 | 73.8 | 81.0 | 84.3 |
| g/100g Sulfopolystyrene | 84.6 | 174.4 | 282.2 | 425.8 | 538.7 |
| Weight % of Total | 46 | 64 | 74 | 81 | 84 |
| Total Mmoles | 27.8 | 18.7 | 13.4 | 9.8 | 8.0 |
| Mmoles/100g Sulfopolystyrene | 51.3 | 51.3 | 51.3 | 51.3 | 51.3 |
| Appearance* | Soft Solid, Not Sticky | Soft, Flows, Sticky | Soft, Flows Sticky | Solid, Very Sticky | Solid, Very Sticky |
| Tensile Strength, psi** | 750 | — | — | — | — |
| Elongation, % | 440 | — | — | — | — |

*Physical appearance of the final dried bulk neutralized polymer.
**Properties of the bulk polymer at room temperature is determined following standard ASTM tests.

EXAMPLE 6

The preparations of Example 5 were repeated exactly with the exception that unmodified polystyrene (Stryon 666) was added instead of a polystyrene sulfonic acid. In each case, the resultant mixtures were non-homogeneous, separating into a solid phase which was opaque and brittle and an oil. This example demonstrates that Tetronics and polystyrene are essentially incompatible. The homogeneous products obtained in Example 5 are the direct result of the neutralization reaction between the Tetronic and the sulfonic acid groups on the polystyrene backbone. The result is that graft copolymers are formed through this process of neutralization.

EXAMPLE 7

Four separate polystyrene sulfonic acids were prepared as described in the earlier examples. They contained the following sulfonic acid levels and possessed the following melt indexes. (See Table VII).

TABLE VII

| Sulfonic Acid, meq./100g Polymer | Melt Index (190° C., 250 psi) g/10 minutes |
|---|---|
| 15.9 | 11.9 |
| 31.6 | 10.2 |
| 51.3 | 5.5 |
| 63.1 | 3.7 |

These four polystyrene sulfonic acids were dissolved in methylene chloride and neutralized with Tetronic 504 (which contains 40 weight % ethylene oxide and possesses a molecular weight of 3400) as described in Example V. Sufficient polystyrene sulfonic acid was used to result in 100 g of neutralized product. The product was stabilized and isolated as described in Example 5. Results are given in Table VIII.

The compositions of the products varied from 35% Tetronic 504 to 68% Tetronic 504 because of the changing sulfonic acid contents of the starting polystyrene sulfonic acids. All products were transparent and homogeneous. They varied in properties from non-sticky solid (tensile strength 1280 psi, elongation 300%) to soft, sticky fluids which flowed on standing at room temperature. All products possessed very high melt flow especially compared to the starting polystyrene sulfonic acids.

This example demonstrates the use of an amine terminated polyalkylene oxide containing 40 weight % ethylene oxide and further demonstrates that the product composition and properties can be varied solely through variations in the sulfonic acid level of the polystyrene sulfonic acid.

TABLE VIII

| Example | 7-A | 7-B | 5-B | 7-C |
|---|---|---|---|---|
| Free Acid, Sulfopolystyrene | | | | |
| SO$_3$H Content, meq./100g Polymer | 15.9 | 31.6 | 51.3 | 63.1 |
| Weight, g | 64.9 | 48.2 | 36.4 | 31.8 |
| Milliequivalents | 10.3 | 15.2 | 18.7 | 20.1 |
| Tetronic | | | | |
| Molecular Weight | 504 | 504 | 504 | 504 |
| Weight % Ethylene Oxide | 3400 | 3400 | 3400 | 3400 |
| | 40 | 40 | 40 | 40 |
| Weight, g | 35.1 | 51.8 | 63.6 | 68.2 |
| g/100g Sulfopolystyrene | 54.1 | 107.4 | 174.4 | 214.5 |
| Weight % of Total | 35 | 52 | 64 | 68 |
| Total Mmoles | 10.3 | 15.2 | 18.7 | 20.1 |
| Mmoles/100g Sulfopolystyrene | 15.9 | 31.6 | 51.3 | 63.1 |
| Appearance* | Solid, Not Sticky | Soft Solid, Very Sticky | Soft, Flows at Room temp. | Soft, Flows at Room temp. |
| Tensile Strength, psi** | 1280 | — | — | — |
| Elongation, % | 300 | — | — | — |

*Physical appearance of the final dried bulk neutralized polymer.
**Properties of the bulk polymer at room temperature as determined following standard ASTM tests.

EXAMPLE 8

The graft copolymer preparations described in Example 7 were repeated with the exception that a different Tetronic (1104) was used. Tetronic 1104 has a higher molecular weight of 8300, but the same 40 weight % ethylene oxide content as Tetronic 504. Results are given in Table IX.

The products derived from these neutralizations contained from 57 weight % to 84 weight % Tetronic. These results obtained from the use of polystyrene sulfonic acids varying in sulfonic acid content.

This example demonstrates the preparation of products with very high levels of grafting oligomer and further demonstrates that variations in composition, and therefore product properties, can be obtained either through variation in the sulfonic acid level of the base polymer or the molecular weight of the grafting oligomer or both.

TABLE IX

| Example | 8-A | 8-B | 5-D | 8-C |
|---|---|---|---|---|
| Free Acid, Sulfopolystyrene | | | | |
| SO H Content, meq./100g Polymer | 15.9 | 31.6 | 51.3 | 63.1 |
| Weight, g | 43.1 | 27.6 | 19.0 | 16.0 |
| Milliequivalents | 6.9 | 8.7 | 9.8 | 10.1 |
| Tetronic | 1104 | 1104 | 1104 | 1104 |
| Molecular Weight | 8300 | 8300 | 8300 | 8300 |
| Weight % Ethylene Oxide | 40 | 40 | 440 | 40 |
| Weight, g | 56.9 | 72.4 | 81.0 | 84.0 |
| g/100g Sulfopolystyrene | 132.0 | 262.3 | 425.8 | 523.7 |
| Weight % of Total | 57 | 72 | 81 | 84 |
| Total Mmoles | 6.9 | 8.7 | 9.8 | 10.1 |
| Mmoles/100g Sulfopolystyrene | 15.9 | 31.6 | 51.3 | 63.1 |
| Appearance* | Solid, A little Sticky | Very Soft, Very Sticky | Solid, Very Sticky | Very Soft, Very Sticky |
| Tensile Strength, psi** | 230 | 170 | — | — |

TABLE IX-continued

| Example | 8-A | 8-B | 5-D | 8-C |
|---|---|---|---|---|
| Elongation, % | 720 | 720 | — | — |

*Physical appearance of the final dried bulk neutralized polymer.
**Properties of the bulk polymer at room temperature as determined following standard ASTM tests.

EXAMPLE 9

The graft copolymer preparations described in Example 7 were repeated with the exception that Tetronic 1107 was used for neutralization rather than Tetronic 504. Tetronic 1107 has both a higher molecular weight (14,500) and a higher ethylene oxide content (70 weight) than Tetronic 504. Results are tabulated in Table X.

All the products were dry, hard, and brittle which reflected both the high ethylene oxide content of the Tetronic and the very high proportion (from 70 weight % to 90 weight %) of Tetronic in the products. All possessed extremely high flow rates (not measurable).

This Example demonstrates the use of higher molecular weight amine terminated polyalkylene oxides and the use of higher ethylene oxide copolymers.

TABLE X

| Example | 9-A | 9-B | 9-C | 9-D |
|---|---|---|---|---|
| Free Acid, Sulfopolystyrene | | | | |
| SO₃H Content, meq./100g Polymer | 15.9 | 31.6 | 51.3 | 63.1 |
| Weight, g | 30.2 | 17.9 | 11.8 | 9.9 |
| Milliequivalents | 4.8 | 5.7 | 6.1 | 6.2 |
| Tetronic | 1107 | 1107 | 1107 | 1107 |
| Molecular Weight | 14,500 | 14,500 | 14,500 | 14,500 |
| Weight % Ethylene Oxide | 70 | 70 | 70 | 70 |
| Weight, g | 69.8 | 82.1 | 88.2 | 90.1 |
| g/100g Sulfopolystyrene | 230.6 | 458.2 | 743.9 | 915.0 |
| Weight % of Total | 70 | 82 | 88 | 90 |
| Total Mmoles | 4.8 | 5.7 | 6.1 | 6.2 |
| Mmoles/100g Sulfopolystyrene | 15.9 | 31.6 | 51.3 | 63.1 |
| Appearance* | Dry, Hard Brittle | Dry, Hard Brittle | Dry, Hard Brittle | Dry, Hard Brittle |

*Physical appearance of the final dried bulk neutralized polymer.

EXAMPLE 10

Graft coplymers through the neutralization of polystyrene sulfonic acid with Tetronics were prepared from a polystyrene sulfonic acid containing 15.9 meq. sulfonic acid/100g polymer. High ethylene oxide content Tetronics (70–80 weight %) were used varying in molecular weight from 12,000 to 27,000. Preparations were conducted as described in earlier examples. Results are given in Table XI.

The products were dry, hard, and brittle in all cases. Melt flow rates were too high to measure. The products varried in composition from 66 weight % to 81 weight % Tetronic.

This example illustrates the use of very high molecular weight amine terminated polyalkylene oxides in combination with a relatively low sulfonic acid level polystyrene sulfonic acid.

TABLE XI

| Example | 10-A | 9-A | 10-B | 10-C |
|---|---|---|---|---|
| Free Acid, Sulfopolystyrene | | | | |
| SO₃H Content, meq./100g Polymer | 15.9 | 15.9 | 15.9 | 15.9 |
| Weight, g | 34.4 | 30.2 | 25.3 | 18.9 |
| Milliequivalents | 5.5 | 4.8 | 4.0 | 3.0 |
| Tetronic | 707 | 1107 | 1307 | 1508 |
| Molecular Weight | 12,000 | 14,500 | 18,600 | 27,000 |
| Weight % Ethylene Oxide | 70 | 70 | 70 | 70 |
| Weight, g | 65.6 | 69.8 | 74.7 | 81.1 |
| g/100g Sulfopolystyrene | 190.8 | 230.6 | 295.6 | 429.3 |
| Weight % of Total | 66 | 70 | 75 | 81 |
| Total Mmoles | 5.5 | 4.8 | 4.0 | 4.0 |
| Mmoles/100g Sulfopolystyrene | 15.9 | 15.9 | 15.9 | 15.9 |
| Appearance* | Dry, Hard Brittle | Dry, Hard Brittle | Dry, Hard Brittle | Dry, Hard Brittle |

*Physical appearance of the final dried bulk neutralized polymer.

EXAMPLE 11

Almost all of the amine terminated polyalkyline oxide neutralized sulfonated polystyrenes presented in examples 1 through 10 (tables III to XI) could be used as basis for hot melt pressure sensitive additives. At the bottom of each table, bulk physical characterisitics of samples are mentioned. It is observed that the properties are a strong function of the type and structure of the amine terminated polyalkyline oxide used to neutralize the sulfonic acid of the polystyrene. In some case, it can be noted that the samples are inherently tacky, see for examples, sample numbers 5B, 5C, 5D, 5E of Table VI; sample number 7B of Table VIII; sample number 8-B, 8-C of Table IX. On the other hand, some samples are not only dry, but could either be soft or brittle depending upon their composition, see for examples, sample numbers 1B, 1C, 1D, 1E of Table III; all samples of Table IV; sample number 5A of Table VI; sample 8A of Table IX; samples of Table X; samples of Table XI, etc. It is thus clear that samples which are inherently tacky could be easily made to meet the requirements for various pressure sensitive adhesives, particularly as hot melt adhesive applications. The properties of such samples can be contrasted by suitable choice of the tackifying resin, filler, plasticizer, etc., as mentioned in the test before. Those skilled in the art, could achieve the desired properties via this formylation routes. The samples which are devoid of inherent tack can be made to possess desired degree of tack by suitably blending them into commercial tackifying resins and plasticized as illustrated from the examples shown in Table XII. For illustrative purposes of this invention, in this table only limited number of samples and their properties are presented. However, an important point to be noted is that we are illustrating those samples which do not possess any tack in their original state but when formulated into suitable system, the materials give properties which indicate their strong potential as pressure sensitive adhesives.

The peel strength values indicated in the above Table XII were obtained by a method similar to ASTM D-429 adhesion test. In brief, the samples were sandwiched between mylar sheets and pressed to a thickness of about 25 mils using a hot press. Rectangular strips of ¼" width and 3" long were cut and 90° peel tests were performed on an Instron at room temperature. The resin free sections of the mylar film were clamped into air jaws to avoid any slippage during pulling. The samples were pulled at 5"/min. crosshead speed. The force and elongation of the samples were recorded on a strip recorder. The force necessary to separate the mylar sheets was taken as the peel strength of the blend.

TABLE XII
Compositions and Properties of Adhesive Formulations

| Blend # | 1 | 2 | 3 | 4 |
|---|---|---|---|---|
| Polymer | | | | |
| Sample 7-A (Table VIII) | 50 | — | — | — |
| Sample 7-B (Table VIII) | — | 50 | — | — |
| Sample 8-A (Table IX) | — | — | 50 | — |
| Sample 8-B (Table IX) | — | — | — | 100 |
| ESCOREZ-1310 | 50 | 50 | 50 | — |
| Flexon-644 | 20 | 20 | 20 | — |
| Properties | | | | |
| Tackiness | Tacky | Very Tacky | Slightly Tacky | Very Slight Tack |
| Peel Strength (pound force) | 0.25 | 0.59 | 0.66 | 0.32 |
| Type of failure* | CF | AF | CF | CF |

*CF — Cohesive Failure;
F — Adhesive Failure

Method of Fabrication of Adhesive Compositions

Because of the significant advances in the packaging technology, the hot melt adhesive compositions can be used by conventional polymer fabricating techniques. After the blending is complete, the adhesive mass can either be extruded and/or calendered to a uniform thickness on top of the substrate which could be paper, cloth, aluminum foil or glass fabric. The temperature and the throughput of the extrusion are variable depending upon the viscosity of the tackifying mass and the desired coating thickness. Typically, the temperature of extrusions and rolls may be from about 200° to 400° F. The substrates or backings to which the pressure sensitive adhesive compositions are applied may be of various porous or nonporous types and they may be organic or inorganic in nature. Most generally, these materials are those which are customarily employed in pressure sensitive tapes, either the cloth or paper backed types or tape backings made of synthetic materials, for example, poyesters such as the copolymer of ethylene glycol with terephtalic acid, vinyls such as a copolymer of vinylidene chloride and vinyl chloride, or a copolymer of vinylidene chloride, polyvinyl acetate, polypropylene, polyethylene, ethylene-propylene plastic copolymer. Sheetings and tapes of cloth or textiles of either natural or synthetic fiber origin, such as glass fiber cloth, wodd, and finally sheets or strips of melts such as steel, copper, aluminum and alloys thereof can also be employed. In general, the backings employed are those which have been heretofore been conventionally employed in preparing pressure sensitive labels, tapes, sheetings and the like and the selection of any particular substrate material is not a specific novel feature of the present invention.

What is claimed is:

1. A hot melt adhesive composition which comprises:
   (a) an amine terminated polyalkylene oxide neutralized sulfonated thermoplastic resin, said neutralized sulfonated thermoplastic resin having about 5 to about 250 meq. of neutralized sulfonated groups per 100 grams of said amine terminated polyalkylene oxide neutralized sulfonated thermoplastic resin; and
   (b) about 25 to about 200 parts by weight of a hydrocarbon tackifying resin consisting of a petroleum or coal tar distillate per 100 parts by weight of said amine terminated polyalkylene oxide neutralized sulfonated thermoplastic resin.

2. The composition according to claim 1 wherein said thermoplastic is selected from the group consisting of polymers prepared by an addition polymerization, wherein the chief monomeric components are selected from the group consisting of the following: styrene, vinyl toluene, t-butylstyrene, alpha-methyl styrene, chlorostyrene, vinyl cyclohexane, 1,6-heptadiene, acrylates and methacrylates; vinyl acylates, vinyl halides, nitrile containing monomers, cyclic monomers, oxycyclobutane, tetrahydrofuran, trimethylene sulfide, lactones; aldehydes; vinyl alkyl ethers; and amide containing monomers.

3. The composition according to claim 1 wherein said thermoplastic is a polyaromatic selected from the group consisting of polystyrene, poly-t-butylstyrene, polyvinyl toluene, and poly-alpha-methylstyrene.

4. The composition of claim 1, wherein said polyalkylene oxide chains composed of homo- and copolymers of terminal epoxides derived from epoxide monomers having the formula

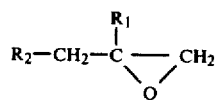

wherein $R_1$ is hydrogen or an alkyl group and $R_2$ is a cycloalkyl, aryl, alkoxy or aryloxy group or halogen.

5. The composition of claim 2, wherein said monoamine of said N-polyalkylene oxide substituted amine derived from said monamine is a primary or secondary amine and said polyamine of said N-polyalkylene oxide substituted amine derived from said polyamine has the formula

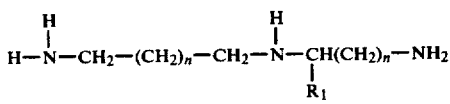

wherein n=0 to 5 and $R_1$ is hydrogen or an alkyl or aryl group.

6. A composition according to claim 1, wherein said polyalkylene oxide substitued amines which are ethoxylated long chain, fatty acid derived amines have the formula

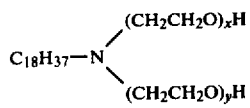

wherein x+y=5 to 200.

7. A composition according to claim 1, wherein said N-polyalkylene oxide substituted polyamines are derived from ethylene diamine, ethylene oxide, and propylene oxide.

8. A composition according to claim 1 wherein said composition is extended with a filler or oil or mixture thereof, wherein said filler is selected from the group consisiting of talcs, calcium carbonates, delaminated calcined and hydrated clays, silicas and carbon blacks and mixtures thereof and said oil is selected from the group consisting of naphthenic, aromatic and paraffin petroleum oils.

9. A composition according to claim 1 wherein amine terminated polyalkylene oxide of said amine terminated polyalkylene oxide neutralized sulfonated thermoplastic resin is a polyalkylene oxide chains composed of homo- and copolymers of terminal epoxide monomers.

10. A composition according to claim 1 wherein amine terminated polyalkylene oxide of said amine terminated polyalkylene oxide neutralized sulfonated thermoplastic resin is an N-polyalkylene oxide substituted amines derived from monamines or polyamines.

11. A composition according to claim 1 wherein amine terminated polyalkylene oxide of said amine terminated polyalkylene oxide neutralized sulfonated thermoplastic resin is an amine terminated polyalkylene oxide chains of homo- or coplymers of alkylene oxides.

12. A composition according to claim 1 wherein amine terminated polyalkylene oxide of said amine terminated polyalkylene oxide neutralized sulfonated thermoplastic resin is an ethoxylated long-chain, fatty acid derived amines.

13. A composition according to claim 1 wherein amine terminated polyalkylene oxide of said amine terminated polyalkylene oxide neutralized sulfonated thermoplastic resin is an N-polyalkylene oxide substituted polyamines.

* * * * *